(12) United States Patent
Gilbert et al.

(10) Patent No.: US 8,300,644 B2
(45) Date of Patent: Oct. 30, 2012

(54) COORDINATION OF USER INFORMATION ACROSS SESSION INITIATION PROTOCOL-BASED PROXY SERVERS

(75) Inventors: Ezra Raphael Gilbert, Highland Park, NJ (US); Venkata R Gilakattula, Matawan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/640,537

(22) Filed: Dec. 17, 2009

(65) Prior Publication Data

US 2010/0091768 A1 Apr. 15, 2010

Related U.S. Application Data

(63) Continuation-in-part of application No. 12/241,971, filed on Sep. 30, 2008, now Pat. No. 7,885,253.

(51) Int. Cl.
H04L 12/56 (2006.01)
(52) U.S. Cl. .................. 370/395.3; 370/432
(58) Field of Classification Search .......... 370/229, 370/330, 241, 252, 351, 389, 395.1, 395.2, 370/428, 352, 242, 395.3, 431, 432, 464, 370/474
See application file for complete search history.

(56) References Cited

U.S. PATENT DOCUMENTS

| | | | |
|---|---|---|---|
| 2002/0136206 A1 | 9/2002 | Gallant et al. | |
| 2004/0121765 A1* | 6/2004 | Idnani et al. | 455/422.1 |
| 2004/0205212 A1* | 10/2004 | Huotari et al. | 709/230 |
| 2006/0036747 A1 | 2/2006 | Galvin, Jr. | |
| 2006/0050648 A1* | 3/2006 | Eydelman | 370/252 |
| 2006/0052087 A1* | 3/2006 | Tuunanen et al. | 455/414.1 |
| 2007/0276907 A1 | 11/2007 | Maes | |
| 2008/0091831 A1 | 4/2008 | Rosenberg | |
| 2008/0280623 A1* | 11/2008 | Danne et al. | 455/453 |
| 2009/0161666 A1 | 6/2009 | Ku | |
| 2010/0008363 A1 | 1/2010 | Ee | |
| 2011/0004615 A1* | 1/2011 | Counterman | 707/769 |

FOREIGN PATENT DOCUMENTS

| | | |
|---|---|---|
| EP | 2 009 870 A1 | 12/2008 |
| WO | 2006092368 A1 | 9/2006 |
| WO | 2008031927 A1 | 3/2008 |

OTHER PUBLICATIONS

Huq, Obaidul, "U.S. Appl. No. 12/241,971 Notice of Allowance Jan. 20, 2010", , Publisher: USPTO, Published in: US.
Euros Morris, "GB Application No. 0822856.1 Search Report", Mar. 9, 2009, Publisher: IPO UK, Published in: GB.
Huq, Obaidul, "U.S. Appl. No. 12/241,971 Office Action May 12, 2010", , Publisher: USPTO, Published in: US.

* cited by examiner

Primary Examiner — Obaidul Huq

(57) ABSTRACT

An improvement in the design and operation of telecommunications networks is disclosed, in which when a calling party's telecommunication terminal does not know the address of the called party's terminal, the calling party's telecommunication terminal contacts its home Session Initiation Protocol (SIP) proxy server (or "home proxy"). Upon determining that it does not already have the called party's address, the home proxy employs one or more techniques in order to obtain that party's address, as well as to retain that address. The first technique of the illustrative embodiment features the usage of a registration event package, which includes SIP-based subscribe and notify mechanisms. The second technique of the illustrative embodiment features the usage of a data distribution service, which operates in a data distribution layer in contrast to utilizing, for example, a SIP mechanism.

21 Claims, 9 Drawing Sheets

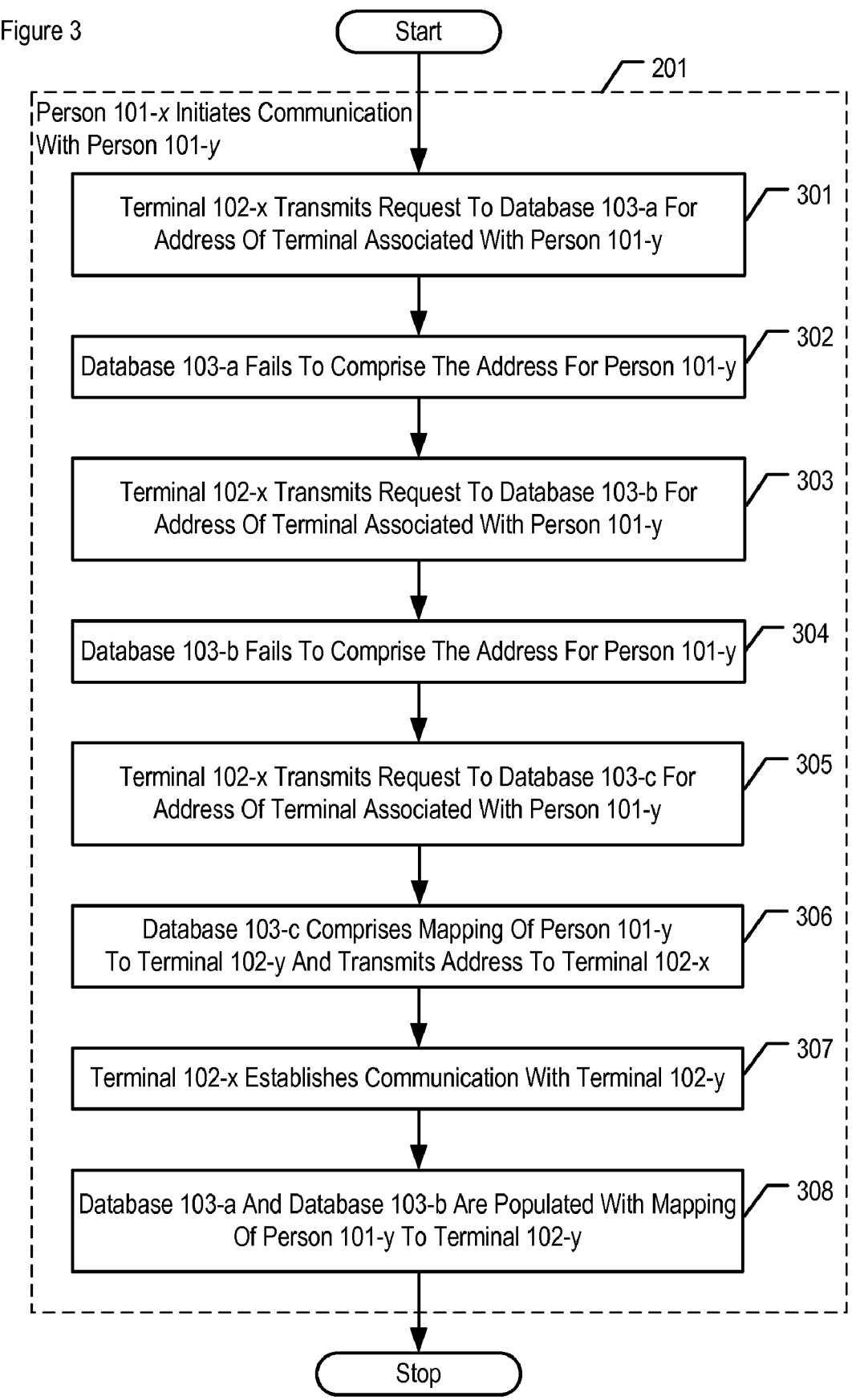

COORDINATION OF USER INFORMATION ACROSS SESSION INITIATION PROTOCOL-BASED PROXY SERVERS

CROSS REFERENCE TO RELATED APPLICATIONS

The following case is incorporated by reference:
(1) U.S. patent application Ser. No. 12/241,971, filed 30 Sep. 2008. If there are any contradictions or inconsistencies in language between this application and the case that has been incorporated by reference that might affect the interpretation of the claims in this application, the claims in this application should be interpreted to be consistent with the language in this application.

TECHNICAL FIELD

The technical field relates to telecommunications in general, and, more particularly, to telecommunications networks with multiple Session Initiation Protocol-based proxy servers.

BACKGROUND

In an older telephone network, a calling party must know the telephone number of the telephone associated with the called party. When the calling party does not know the telephone number, the calling party can contact directory assistance to get the number.

Newer telecommunications networks, such as Voice-over-Internet-Protocol ("VoIP") networks, can be based on the Session Initiation Protocol, or "SIP," which handles the call control. In such a network, when a calling party's "home" Session Initiation Protocol proxy server receives a request for a called party whose information is not known to the home proxy server, it forwards the request to another proxy server referred to as the "edge" proxy server. The edge proxy server uses a similar mechanism as used by the home proxy server, in order to route the request to the next segment of the network.

In the mechanisms used by these proxy servers in the prior art, the number of segments that it takes for a request to get from the calling party to the called party is fixed. Each segment is associated with a certain amount of processing. The processing typically includes message reception, message parsing, message validation, transaction management, authentication, authorization, location service lookup, and so forth. The processing that is associated with each segment, when added together for all of the segments traversed because of the request, can equate to a significant amount of processing.

For this reason, the need exists for an improvement in the operation of Session Initiation Protocol-based networks, as well as similar networks.

SUMMARY

An improvement is provided in the design and operation of telecommunications networks. In accordance with the illustrative embodiment, when a calling party's telecommunication terminal does not know the address of the called party's terminal, the calling party's telecommunication terminal contacts its home Session Initiation Protocol (SIP) proxy server (or "home proxy"). Upon determining that it does not already have the called party's address, the home proxy employs one or more techniques in order to obtain that party's address, as well as to retain that address. The first technique of the illustrative embodiment features the usage of a registration event package, which includes SIP-based subscribe and notify mechanisms. The second technique of the illustrative embodiment features the usage of a data distribution service, which operates in a data distribution layer in contrast to utilizing, for example, a SIP mechanism.

In the first technique of the illustrative embodiment, a near-end proxy server receives from a calling party a SIP request for a party to be contacted. The routing information of the party to be contacted is unknown to the near-end proxy server, in that no mapping of any indicium of the party being contacted to the address of that party is already present at the server. As a result, the near-end proxy subscribes to the registration event package for that party, which is defined in RFC 3680, in order to obtain the user information that is currently absent from the near-end proxy, such as the party's address within the telecommunications network. The technique of the illustrative embodiment utilizes the registration event package mechanism, not only to initially obtain the party's address, but also to update the information as it changes.

In the second technique of the illustrative embodiment, as a result of the aforementioned routing information of the party to be contacted being unknown to the near-end proxy server, the near-end proxy transmits a query to the data distribution service. The purpose of the query is to indicate an interest in obtaining the user information that is currently absent from the near-end proxy, such as the party's address within the telecommunications network. The technique of the illustrative embodiment utilizes the data distribution service mechanism, not only to initially obtain the party's address, but also to update the information as it changes.

In some embodiments, the circumstances by which the address of the called party is obtained by the near-end home proxy are based on predetermined parameters that include, but are not limited to, the passage of time, how often the called party has been called, how often the called party is registered at a proxy that is different from the proxy of a calling party, and so forth. Furthermore, in some embodiments, the retention of the address at the near-end home proxy is managed in order to remove stale information from the proxy. The retention can be based on one or more of the same predetermined parameters referred to above.

The techniques of the illustrative embodiment result in a called party's address becoming present at a near-end proxy server, not just for a single calling party but for any party who attempts to contact the called party from that near-end proxy. In other words, in subsequent SIP requests for that called party, the need to forward the requests to an edge proxy, as well as to the far-end proxy, is eliminated. Instead, the near-end proxy can directly forward at least some of the requests to the called party's far-end proxy. Advantageously, the presence of the called party's address at the near-end proxy reduces the number of segments that must be traversed to obtain the address, thereby reducing the processing that is associated with requesting and receiving the address. Some situations in which this benefit occurs is where a call is originated outside of a business enterprise or where a call is originated within the enterprise but to a user who is outside of the enterprise.

The illustrative embodiment comprises: receiving, at a first node, a first request from a first telecommunications terminal for an address of a first party in a telecommunications network; and transmitting, from the first node to a second node, a request for subscribing to a Session Initiation Protocol registration event package for the first party, wherein the transmitting of the request for subscribing is based on a mapping of any indicium of the first party to the address of the first party being absent from the first node.

BRIEF DESCRIPTION OF THE DRAWINGS

FIG. 3 depicts a flowchart of the salient tasks associated with task 201, as depicted in FIG. 2.

DETAILED DESCRIPTION

Figure 1:
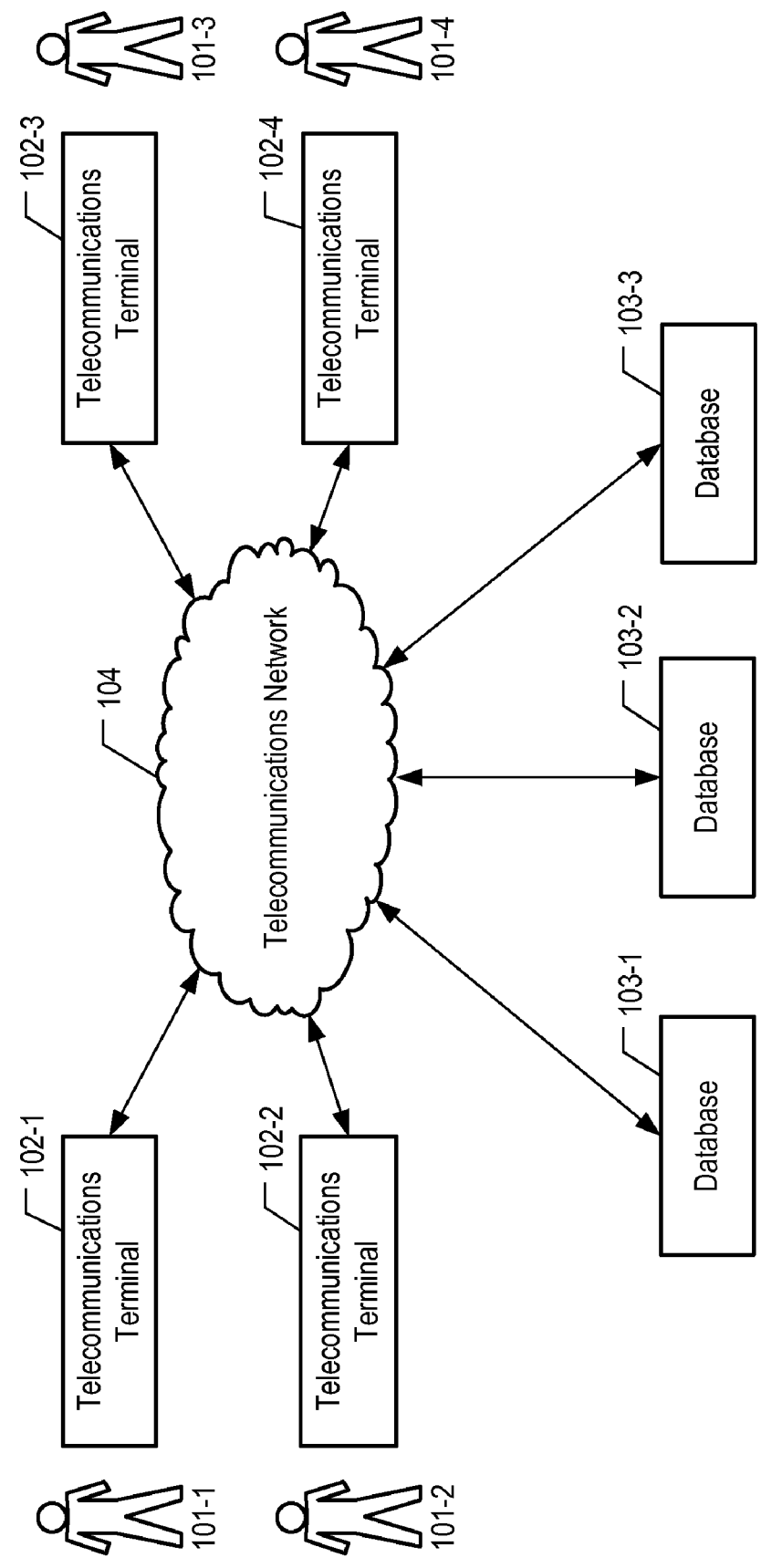
FIG. 1 depicts a schematic diagram of a portion of telecommunications system 100 in accordance with the illustrative embodiment.

FIG. 1 depicts a schematic diagram of a portion of telecommunications system 100 in accordance with the illustrative embodiment. Telecommunications system 100 comprises: telecommunications terminals 102-1 through 102-4 serving users 101-1 through 101-4, databases 103-1 through 103-3, and telecommunications network 104, interconnected as shown. Although telecommunications system 100 comprises four telecommunications terminals serving four users, and three databases, it will be clear to those skilled in the art, after reading this disclosure, how to make and use alternative embodiments which comprise any number of telecommunications terminals that serve any number of users, and comprise any number of databases.

Telecommunications terminal 102-$x$ comprises hardware and software for enabling user 101-$x$ to communicate with user 101-$y$ who is using telecommunications terminal 102-$y$, wherein x & y∈{1, 2, 3, 4} and x≠y. In accordance with the illustrative embodiment, telecommunications terminal 102-$x$ is a Voice-over-Internet-Protocol ("VoIP") device that uses the Session Initiation Protocol (SIP) and communicates by using Internet Protocol packets. As those who are skilled in the art will appreciate, in some alternative embodiments the terminal itself uses a protocol other than SIP, such as H.323. Additionally, one or more of the terminals might use another method of media signal transmission than IP packets. For example, in various alternative embodiments, the terminal can be an analog terminal or a time-division multiplexed terminal that interacts with a transcoding system such as a private-branch exchange (PBX) or gateway, which converts the media signals into a format that is suitable for transmission through network 104.

Database 103-$a$ is associated with hardware and software, and enables telecommunications terminal 102-$x$ to initiate communication with telecommunications terminal 102-$y$, wherein a ∈{1, 2, 3}. In particular, database 103-$a$ is part of a Session Initiation Protocol Proxy server, which comprises a table that lists a mapping of an indicium of a user to an address of a telecommunications terminal in telecommunications network 104. The address of the user's telecommunications terminal is also referred to as the address of the user, or party. An example of such a list is depicted in Table 1.

TABLE 1

Mapping of Users to Addresses
in Telecommunications Network 104

| User | Address |
|---|---|
| John Lennon | 192.245.2.1 |
| George Harrison | 128.33.22.1 |
| Ringo Starr | 42.222.43.1 |

Although database 103-$a$ is part of a Session Initiation Protocol server, it will be clear to those skilled in the art, after reading this disclosure, how to make and use alternative embodiments in which database 103-$a$ conforms to a different protocol.

In some embodiments, the exchange of data among databases 103-1 through 103-3 is coordinated through a data distribution service, which is described below and with respect to FIG. 8.

Telecommunications network 104 is the Internet, but it will be clear to those skilled in the art, after reading this disclosure, how to make and use alternative embodiments in which telecommunications network 104 is another network, such as for example and without limitation, the Public Switched Telephone Network, another type of public network, a private network, a wireless network, a wireline network, etc. Additionally, the address of the user's terminal can be unique within a telecommunications network such as network 104, or at least among a subset of nodes within that network.

Figure 2:
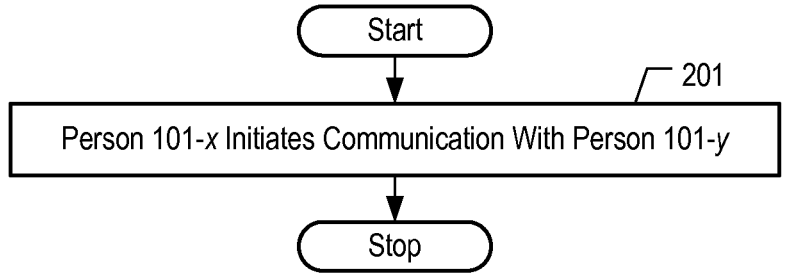
FIG. 2 depicts a flowchart of the salient macro-task performed by the illustrative embodiment.

FIG. 2 depicts a flowchart of the salient macro-task performed by the illustrative embodiment. At task 201, user 101-$x$ initiates communication with user 101-$y$ through telecommunications network 104. In accordance with the illustrative embodiment, task 201 is performed from each user 101-$x$ to each user 101-$y$. The details of task 201 are described in detail below and with respect to FIG. 3.

FIG. 3 depicts a flowchart of the salient tasks associated with task 201, as depicted in FIG. 2.

At task 301, user 101-$x$ uses telecommunications terminal 102-$x$ (i.e., the "calling" terminal) to call user 101-$y$ (i.e., the "called" terminal). As part of task 301, telecommunications terminal 102-$x$ transmits a request to database 103-$a$ for the address of the telecommunications terminal associated with user 101-$y$.

At task 302, database 103-$a$ transmits—and telecommunications terminal 102-$x$ receives—notification that database fails to comprise an address in telecommunications network 104 for user 101-$y$.

Because the request to database 103-$a$ in task 301 failed, at task 303, telecommunications terminal 102-$x$ transmits a request to database 103-$b$ for the address of the telecommunications terminal associated with user 101-$y$.

At task 304, database 103-$b$ transmits—and telecommunications terminal 102-$x$ receives—notification that database fails to comprise an address in telecommunications network 104 for user 101-$y$.

Because the request to database 103-$a$ in task 303 failed, at task 305, telecommunications terminal 102-$x$ transmits a request to database 103-*c* for the address of the telecommunications terminal associated with user 101-*y*.

At task 306, database 103-*c* transmits—and telecommunications terminal 102-*x* receives—the address of the telecommunications terminal associated with user 101-*y*.

At task 307, telecommunications terminal 102-*x* establishes communication with telecommunications terminal 102-*y*, which enables user 101-*x* to talk with user 101-*y*.

At task 308, database 103-*a* and database 103-*b* are populated with a mapping of an indicium of user 101-*y* to the address of telecommunications terminal 102-*y* in telecommunications network 104. The databases are populated with the mapping so that the databases have the mapping information for the next time that a terminal requests an address. The details of task 308 are described below and with respect to FIGS. 4 through 7.

Figure 4:
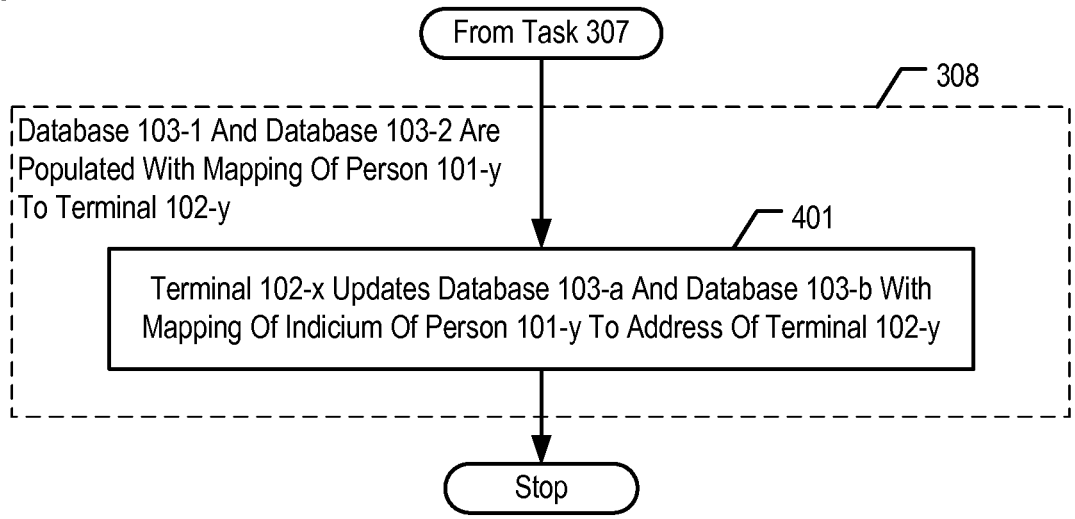
FIG. 4 depicts a flowchart of a first method for performing task 308.

FIG. 4 depicts a flowchart of a first method for performing task 308, in which the "calling" terminal initiates a database update. At task 401, terminal 102-*x*—that is, the calling terminal—updates both database 103-*a* and database 103-*b* with the mapping of an indicium of user 101-*y* to the address of terminal 102-*y* in network 104.

Figure 5:
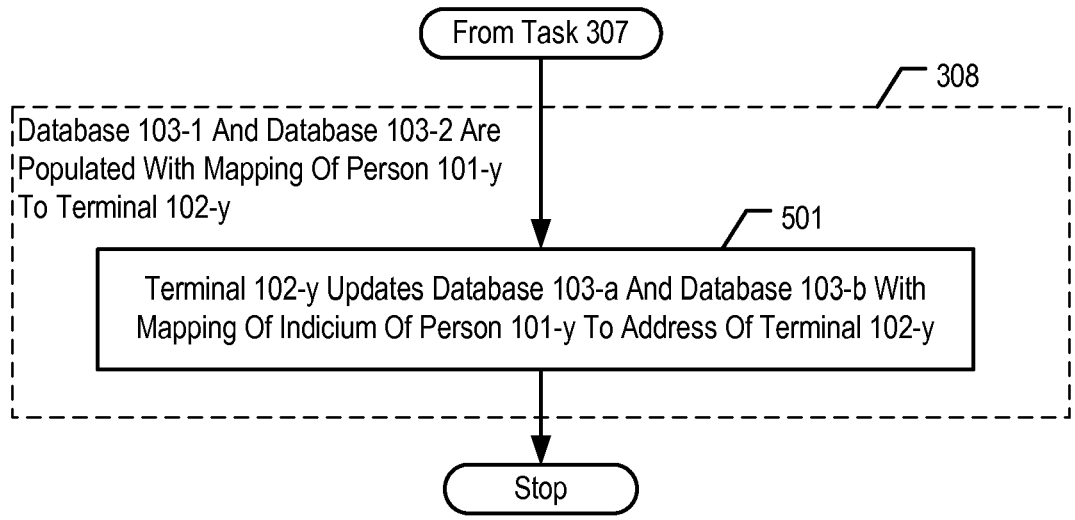
FIG. 5 depicts a flowchart of a second method for performing task 308.

FIG. 5 depicts a flowchart of a second method for performing task 308, in which the "called" terminal initiates a database update. At task 501, terminal 102-*y*—that is, the called terminal—updates both database 103-*a* and database 103-*b* with the mapping of an indicium of user 101-*y* to the address of terminal 102-*y* in network 104.

Figure 6:
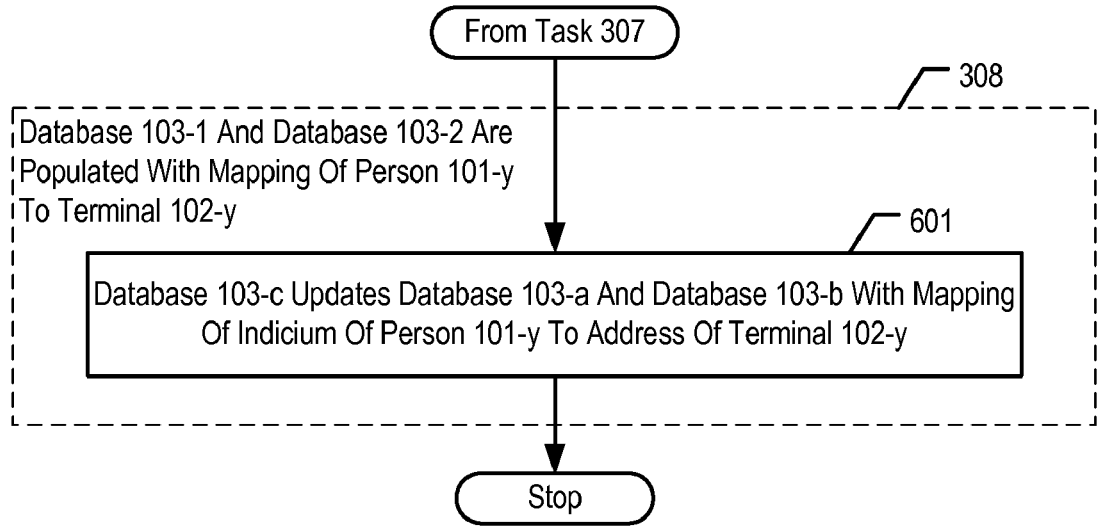
FIG. 6 depicts a flowchart of a third method for performing task 308.

FIG. 6 depicts a flowchart of a third method for performing task 308, in which a first database initiates a database update in one or more additional databases. At task 601, database 103-*c* updates both database 103-*a* and database 103-*b* with the mapping of an indicium of user 101-*y* to the address of terminal 102-*y* in network 104.

Figure 7:
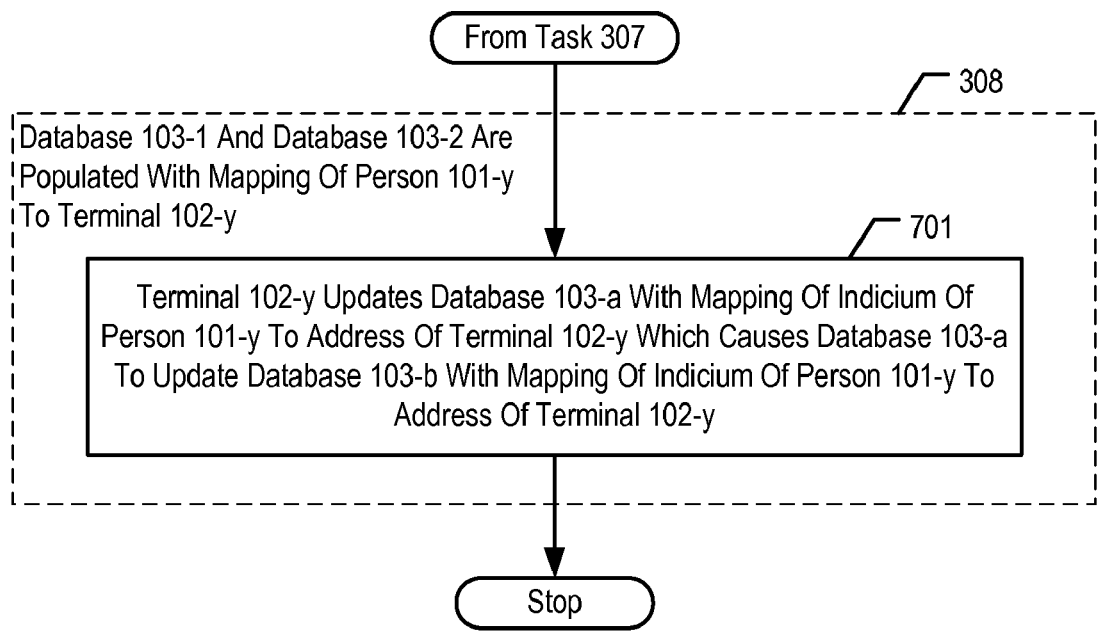
FIG. 7 depicts a flowchart of a fourth method for performing task 308.

FIG. 7 depicts a flowchart of a fourth method for performing task 308, in which a first database initiates a sequential database update in a second database and then continuing in one or more additional databases. At task 701, database 103-*c* updates database 103-*a* with the mapping of an indicium of user 101-*y* to the address of terminal 102-*y* in network 104. This causes database 103-*a* to then update database 103-*b* with the mapping of an indicium of user 101-*y* to the address of terminal 102-*y* in network 104.

Figure 8:
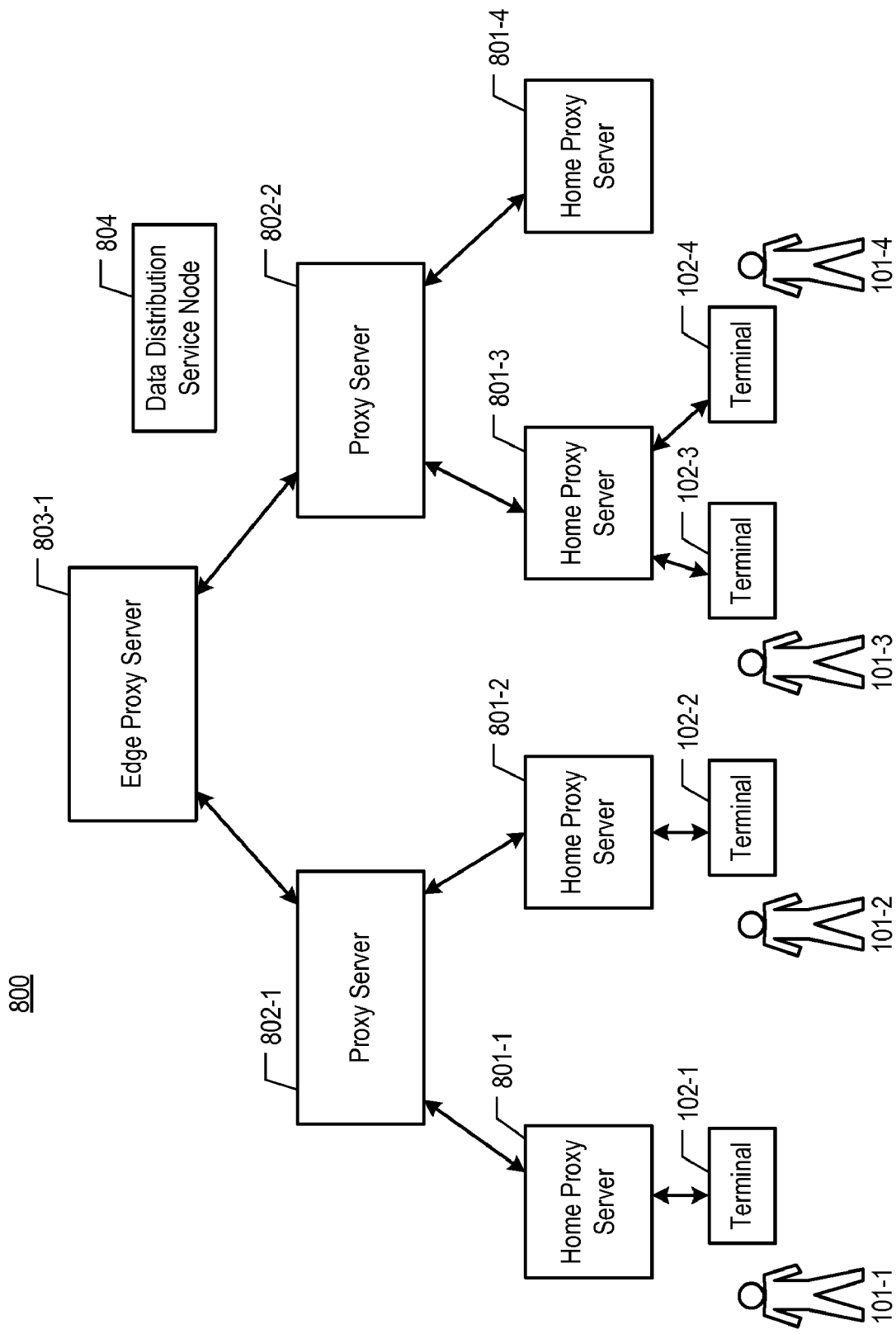
FIG. 8 depicts a schematic diagram of a portion of telecommunications system 800, which is an alternative representation of system 100.

FIG. 8 depicts a schematic diagram of a portion of telecommunications system 800, which is an alternative representation of system 100 as depicted in FIG. 1, in accordance with the illustrative embodiment. Telecommunications system 800 comprises: telecommunications terminals 102-1 through 102-4 serving users 101-1 through 101-4, home proxy servers 801-1 through 801-4, proxy servers 802-1 and 802-2, and edge proxy server 803-1, interconnected as shown. The salient components of proxy server 801-1 are depicted with respect to FIG. 9, which is also representative of one or more of the other proxy servers depicted in FIG. 8. System 800 also comprises data distribution service node 804, which is interconnected with one or more of the already identified elements of FIG. 8.

Telecommunications system 800 comprises four telecommunications terminals serving four users, four home proxy servers, one edge proxy server, and two additional proxy servers that are intermediate to the home proxies and the edge proxy, in which the proxy servers are arranged at three hierarchical levels. However, it will be clear to those skilled in the art, after reading this disclosure, how to make and use alternative embodiments which comprise any number of telecommunications terminals that serve any number of users, and comprise any number of proxy servers at any number of hierarchical levels.

Each proxy server node comprises one or more databases such as databases 103-1 through 103-3. In some embodiments, the exchange of data between two or more of the databases is coordinated by a data distribution service. Data distribution service node 804 coordinates the exchange of data in the data distribution layer, and has access to all pertinent user data, such as for users 101-1 through 101-4 and for their respective terminals 102-1 through 102-4. A hierarchical relationship exists between a master database at node 804 and replica databases at one or more other nodes, such as home proxy 801-1. In this relationship, the replica database or databases are subordinate to the master database such that the master database concentrates a set of data from one or more sources that are external to the master database, and the replica databases receive at least a portion of the set of data from the master database.

In order to exchange data among the databases, node 804 can, for example, utilize the technique disclosed in co-pending U.S. patent application Ser. No. 11/688,751, filed 20 Mar. 2007, which is incorporated herein by reference. This technique features a data packet that is an autonomous encapsulation of data, a subsection of a data model at a certain time in relation to other data in the system at another time. The data packet itself is identified at a particular time and value with a globally unique identifier. Relationships of the data packet to other data packets are made known by using references to the other packets. As a result, referenced data packets are retrieved throughout the system based on their relationships to each other.

Continuing with the example, whenever a query for information such as a user's address is transmitted, each node involved in the transmission applies business logic rules. These rules for handling one or more data packets determine i) where a data packet comprising the sought-after information has to be transmitted to and ii) what to do with the data packet when received. Additionally, the rules can be based on the relationship of two or more nodes to each other. For instance, a distribution node such as node 804 containing a master database might have transmission rules that it has distributed to regional nodes such as proxy servers 802-1 and 802-2 containing replica databases; in a situation where a first replica database is a backup of a second replica database, the master node has distributed equivalent copies to the nodes hosting the replica databases. Then, the node that hosts the first replica database might have rules specifying that it updates the routing rules in its database and then distributes those routing rules to all of its sub-nodes, such as the home proxy servers.

In any event, it will be clear to those skilled in the art, how to make and use a data distribution service for the purpose of distributing user data among the databases.

Figure 10:
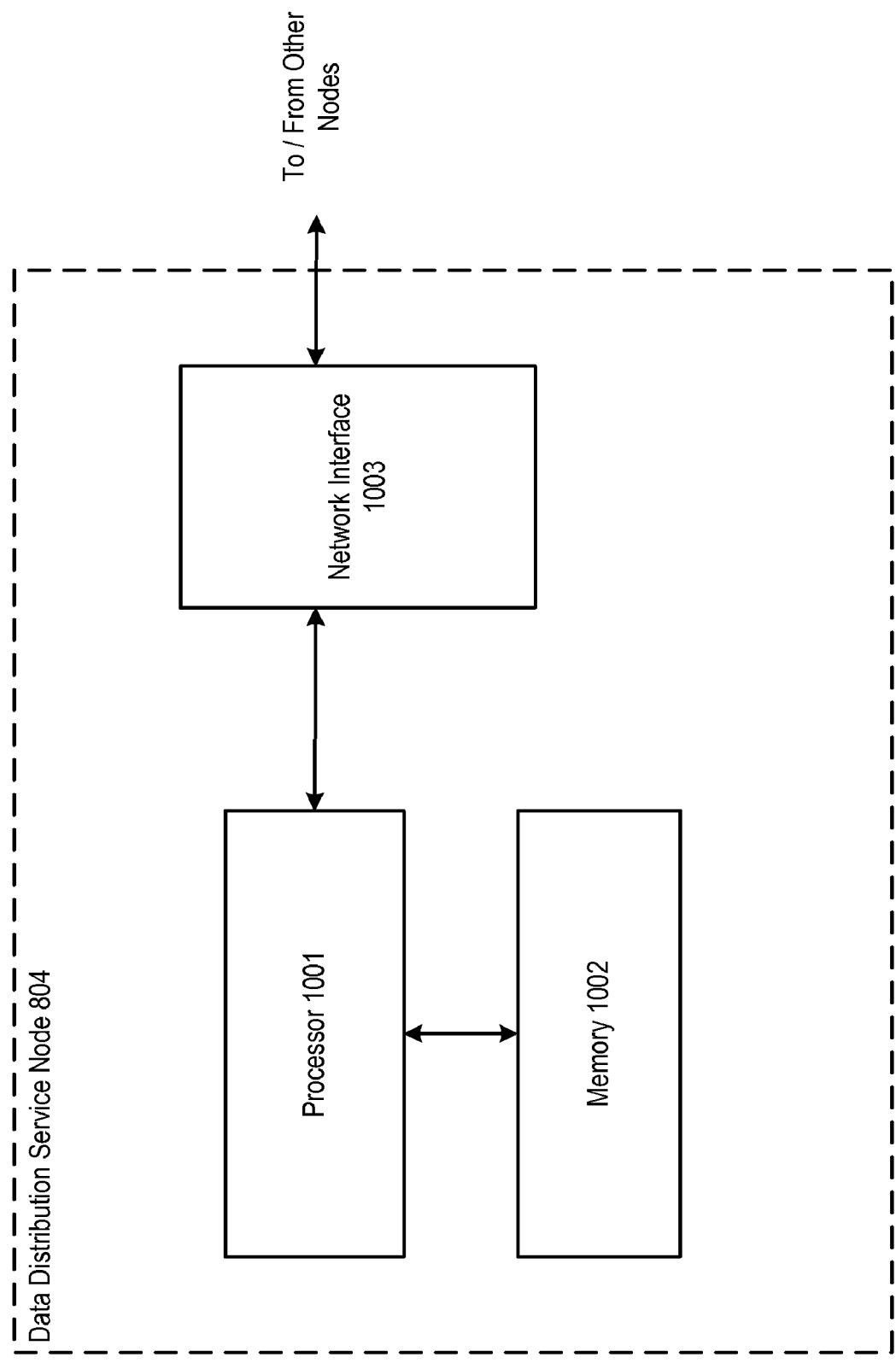
FIG. 10 depicts the salient components of data distribution service node 804 within system 800.

In accordance with the illustrative embodiment, data distribution service node 804 is part of a data-processing system (e.g., a server, etc.) that is physically distinct from any of the other nodes depicted in FIG. 8. The salient components of node 804 are depicted in FIG. 10. As those who are skilled in the art will appreciate, however, in some alternative embodiments node 804 can be part of one or more of the other nodes (e.g., edge proxy server 803-1, etc.) that are depicted in FIG. 8.

Proxy servers 801-1 through 801-4, 802-1 and 802-2, and 803-1 are capable of performing the tasks described with respect to one or more of FIGS. 2 through 7, 11, and 12, and in accordance with the illustrative embodiment. In some embodiments, the proxy servers are further capable of performing tasks in the prior art, such as the tasks that are now summarized here. In the prior art, when a calling (or contacting) party's home proxy receives a Session Initiation Protocol (SIP) request for a user whose information is not known to the calling party's proxy, it forwards the request to another proxy, such as an edge proxy or a proxy that is in between the home proxy and the edge proxy. The forwarded-to proxy uses a similar mechanism as the home proxy to route the request to the next node. This process repeats itself until the home proxy of the called (or contacted) party is reached. The called party's home proxy server then returns the requested information to the calling party's home proxy server.

For example, if terminal 102-1 (i.e., the calling party's terminal) is attempting to initiate a session with terminal 102-4 (i.e., the called party's terminal), but proxy server 801-1 (i.e., the home proxy of terminal 102-1) is unaware of terminal 102-4's proxy information or location, server 801-1 will then forward the request to proxy server 802-1. Server 802-1 will then forward the request to server 803-1, which will then forward the request to server 802-2. Server 802-2 will then forward the request to server 801-3, which is the home proxy of terminal 102-4.

Figure 9:
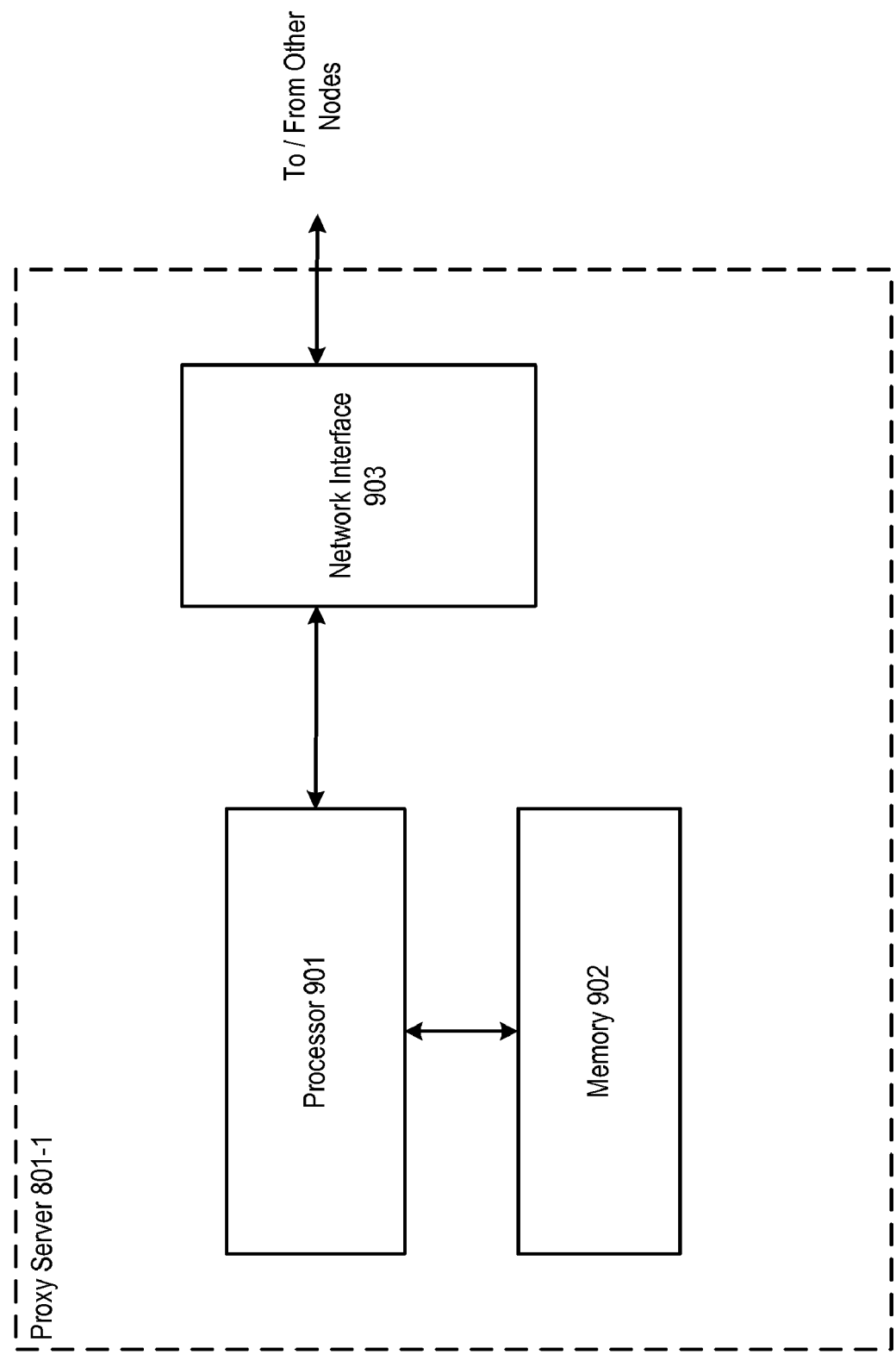
FIG. 9 depicts the salient components of proxy server 801-1 within system 800.

FIG. 9 depicts the salient components of proxy server 801-1, in accordance with the illustrative embodiment. Proxy server 801-1 comprises processor 901, memory 902, and network interface 903, interconnected as shown.

Processor 901 is a general-purpose processor that is capable of controlling network interface 903. Processor 901 is also capable of executing instructions stored in memory 902, reading data from and writing data into memory 902, and executing the tasks described below and with respect to the figures provided herein, including the tasks executed by one or more proxy servers in FIGS. 11 and 12. In some alternative embodiments, processor 901 is a special-purpose processor. In any event, it will be clear to those skilled in the art, after reading this specification, how to make and use processor 901.

Memory 902 comprises one or more storage devices for storing the instructions and data used by processor 901. In particular, memory 902 stores a database that comprises mappings of indicia of call parties to the addresses of those parties. Memory 902 might be any combination of dynamic random-access memory (RAM), flash memory, disk drive memory, and so forth. It will be clear to those skilled in the art, after reading this specification, how to make and use memory 902.

Network interface 903 comprises a receiver portion and a transmitter portion. The receiver portion receives packets from one or more other nodes in telecommunications system 800, decodes information encoded in the packets including SIP-related information, and forwards the decoded information to processor 901, in well-known fashion. The transmitter portion receives from processor 901 information to be transmitted including SIP-related information, encodes the information, and transmits the encoded information to one more nodes in system 800, in well-known fashion. It will be clear to those skilled in the art, after reading this specification, how to make and use network interface 903.

FIG. 10 depicts the salient components of data distribution service node 804, in accordance with the illustrative embodiment. Node 804 comprises processor 1001, memory 1002, and network interface 1003, interconnected as shown.

Processor 1001 is a general-purpose processor that is capable of controlling network interface 1003. Processor 1001 is also capable of executing instructions stored in memory 1002, reading data from and writing data into memory 1002, and executing the tasks described below and with respect to the figures provided herein, including the tasks executed by node 804 in FIG. 12. In some alternative embodiments, processor 1001 is a special-purpose processor. In any event, it will be clear to those skilled in the art, after reading this specification, how to make and use processor 1001.

Memory 1002 comprises one or more storage devices for storing the instructions and data used by processor 1001. In particular, memory 1002 stores a master database to which one or more replica databases are subordinate and from which node 804 distributes current data to those replica databases, as described above and with respect to FIG. 8. Memory 1002 might be any combination of dynamic random-access memory (RAM), flash memory, disk drive memory, and so forth. It will be clear to those skilled in the art, after reading this specification, how to make and use memory 1002.

Network interface 1003 comprises a receiver portion and a transmitter portion. The receiver portion receives packets from one or more other nodes in telecommunications system 800, decodes information encoded in the packets, and forwards the decoded information to processor 1001, in well-known fashion. The transmitter portion receives information from processor 1001 to be transmitted, encodes the information, and transmits the encoded information to one more nodes in system 800, in well-known fashion. It will be clear to those skilled in the art, after reading this specification, how to make and use network interface 1003.

Figure 11:
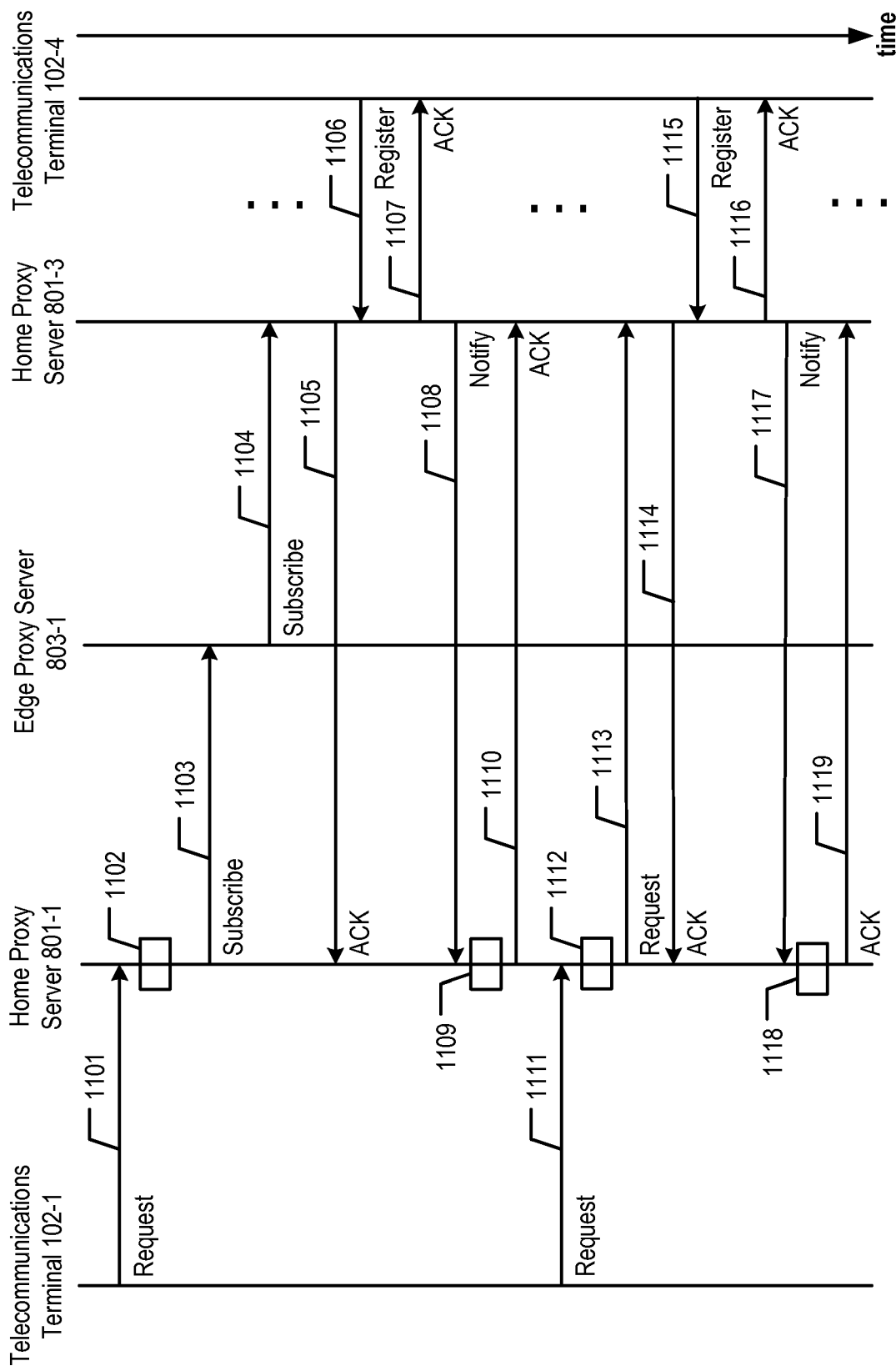
FIG. 11 depicts a first call flow, in accordance with the illustrative embodiment.

FIG. 11 depicts a first call flow that involves telecommunications terminals 102-1 and 102-4, in accordance with the illustrative embodiment. The first call flow features the usage of a registration event package, which includes subscribe and notify mechanisms. As those who are skilled in the art will appreciate, some of the tasks that appear in the figures can be performed in parallel or in a different order than that depicted. Moreover, those who are skilled in the art will further appreciate that in some alternative embodiments, only a subset of the depicted tasks are performed.

The salient tasks depicted in FIG. 11 are described, for the most part, from the perspective of the home proxy server of the telecommunications terminal that is initiating SIP requests. Specifically, server 801-1 is the home proxy for terminal 102-1, which is the requesting terminal. As those who are skilled in the art will appreciate, in some alternative embodiments, some or all of those tasks can be performed at a different data-processing system. For example, if terminal 102-2 is requesting proxy information of a user (i.e., by making a SIP request), then server 801-2 can perform at least some of the tasks described.

In some other alternative embodiments, a proxy server that is not the home proxy of a requesting terminal can perform some or all of the described tasks. For example, edge proxy server 803-1 can perform some or all of the tasks that are described below as being performed by home proxy server 801-1; in this case, server 801-1 might always forward the request in well-known fashion to server 802-1, which forwards the request to server 803-1, which performs the tasks of the illustrative embodiment, including the subscribing to a registration event package described below.

In the illustrative call flow, a proxy server, in this case server 801-1, receives from terminal 102-1 a Session Initiation Protocol (SIP) request for a party to be contacted, in this case user 101-4 associated with terminal 102-4. The routing information of the party to be contacted is not known to server 801-1; that is, a mapping of any indicium of user 101-4 to the address of the user is not already present at the server. In accordance with the illustrative embodiment, server 801-1 as a result subscribes to the registration event package for that user, in order to obtain the user information that is currently absent from (i.e., not present at) server 801-1, such as the user's address within system 800. For reasons of clarity, the intermediate proxy servers (i.e., servers 802-1 and 802-2) are not shown in FIG. 11.

At task 1101, home proxy server 801-1 receives a SIP request message from terminal 102-1, in well-known fashion. For example, this request might correspond to a SIP INVITE for initiating a call session between terminals 102-1 and 102-4. In transmitting the message, terminal 102-1 requests the address of user 101-4. A mapping of an indicium of a user to the address of a telecommunications terminal, such as the address of user 101-4's terminal, is described above and with respect to Table 1.

At task 1102, server 801-1 determines whether the desired information about user 101-4 is already present at the server. Additionally, in some embodiments, server 801-1 forwards the received request in well-known fashion.

At task 1103, server 801-1 transmits a subscribe request to proxy server 801-3, by way of server 802-1, in order to request notification of a specified type of event. In accordance with the illustrative embodiment, the request is transmitted for the purpose of subscribing to a Session Initiation Protocol registration event package for user 101-4. The registration event package is defined in accordance with RFC 3680 (i.e., "request for comments" document 3680), as is known in the art. The transmitting of the request is based on a mapping of any indicium of the user to the address of user 101-4 being absent from the server, as determined at task 1102.

In some embodiments, the transmitting of the request can be based on how often the called party is contacted, or on some other call statistic related to the called party, which statistic can be determined from a call log, for example.

At task 1104, server 803-1 forwards the subscribe request to server 801-3, by way of server 802-2.

At task 1105, server 801-1 receives an acknowledgment message from proxy server 801-3 in response to having sent the request at task 1103.

Meanwhile, and asynchronously with respect to the tasks described thus far, terminal 102-4 registers with its home proxy, server 801-3. For example, terminal 102-4 might register once, sporadically, or periodically, in well-known fashion. As depicted, proxy server 801-3 receives a registration from terminal 102-4 at task 1106, followed by acknowledging the registration at task 1107.

At task 1108, server 801-1 receives a notify message, which conveys a notification of a subscribed event in well-known fashion. In this case, the subscribed event corresponds to terminal 102-4 having registered at task 1106.

At task 1109, server 801-1 populates a database with a mapping of i) a predetermined indicium of user 101-4 to ii) user 101-4's address that was received at task 1108. At task 1110, server 801-1 also acknowledges having received the notify message, in well-known fashion.

At task 1111, proxy server 801-1 receives a SIP request message from a terminal, in well-known fashion. This request message may be received from terminal 102-1, as was the case at task 1101, or the request message may be received from a different terminal. For example, the request might correspond to a SIP INVITE for initiating a call session between the requesting terminal and 102-4. In transmitting the message, terminal 102-1 requests the address of user 101-4.

At task 1112, server 801-1 determines whether the desired information about user 101-4 is already present at the server. Additionally, in some embodiments, server 801-1 forwards the received request in well-known fashion.

At task 1113, server 801-1 forwards the SIP request to proxy server 801-3, in order to initiate a session with user 101-4. The transmitting of the request is based on the mapping of the indicium of the user to the address of user 101-4 being present, as the result of the populating of the database performed at task 1109. Because the mapping of the indicium to the address is now present at server 801-1, the server is able to forward the request without relying on any other proxy— that is, the proxies between servers 801-1 and 801-3 are bypassed.

At task 1114, server 801-1 receives an acknowledgment message from proxy server 801-3 in response to having sent the request at task 1113.

Meanwhile, and asynchronously with respect to at least some of the tasks described thus far, terminal 102-4 registers with its home proxy, server 801-3. For example, terminal 102-4 might register once, sporadically, or periodically, in well-known fashion. As depicted, proxy server 801-3 receives a registration-related message from terminal 102-4 at task 1115, followed by acknowledging the registration at task 1116. In this case, the registration-related message is actually a de-registration, such as when terminal 102-4 is moving away from server 801-3 to a new home proxy (e.g., proxy 801-4, etc.).

At task 1117, server 801-1 receives a notify message, which conveys a notification of a subscribed event in well-known fashion. In this case, the subscribed event corresponds to terminal 102-4 having de-registered from server 801-3 at task 1115.

At task 1118, server 801-1 deletes, from the database, the mapping of the indicium of user 101-4 to the address that was received at task 1108. The decision to delete the address from the database, instead of adding an address, is based on the type of subscribed event in the notification received at task 1117, in this case a de-registration. This is one way in which server 801-1 keeps information in the database from becoming stale.

In some embodiments, a decision to delete the address can be based on the elapsing of a time interval since the mapping of the indicium to the address became present at the node, in this case at task 1109. This is another way in which server 801-1 keeps information in the database from becoming stale.

At task 1119, server 801-1 also acknowledges having received the notify message, in well-known fashion.

As those who are skilled in the art will appreciate, the call flow depicted in FIG. 11 can continue beyond merely those tasks depicted. What will also be appreciated is that any number of home proxy servers can concurrently perform the tasks of the illustrative embodiment for one or more requesting terminals being served, in which those terminals request user information related to one or more parties being contacted.

Figure 12:
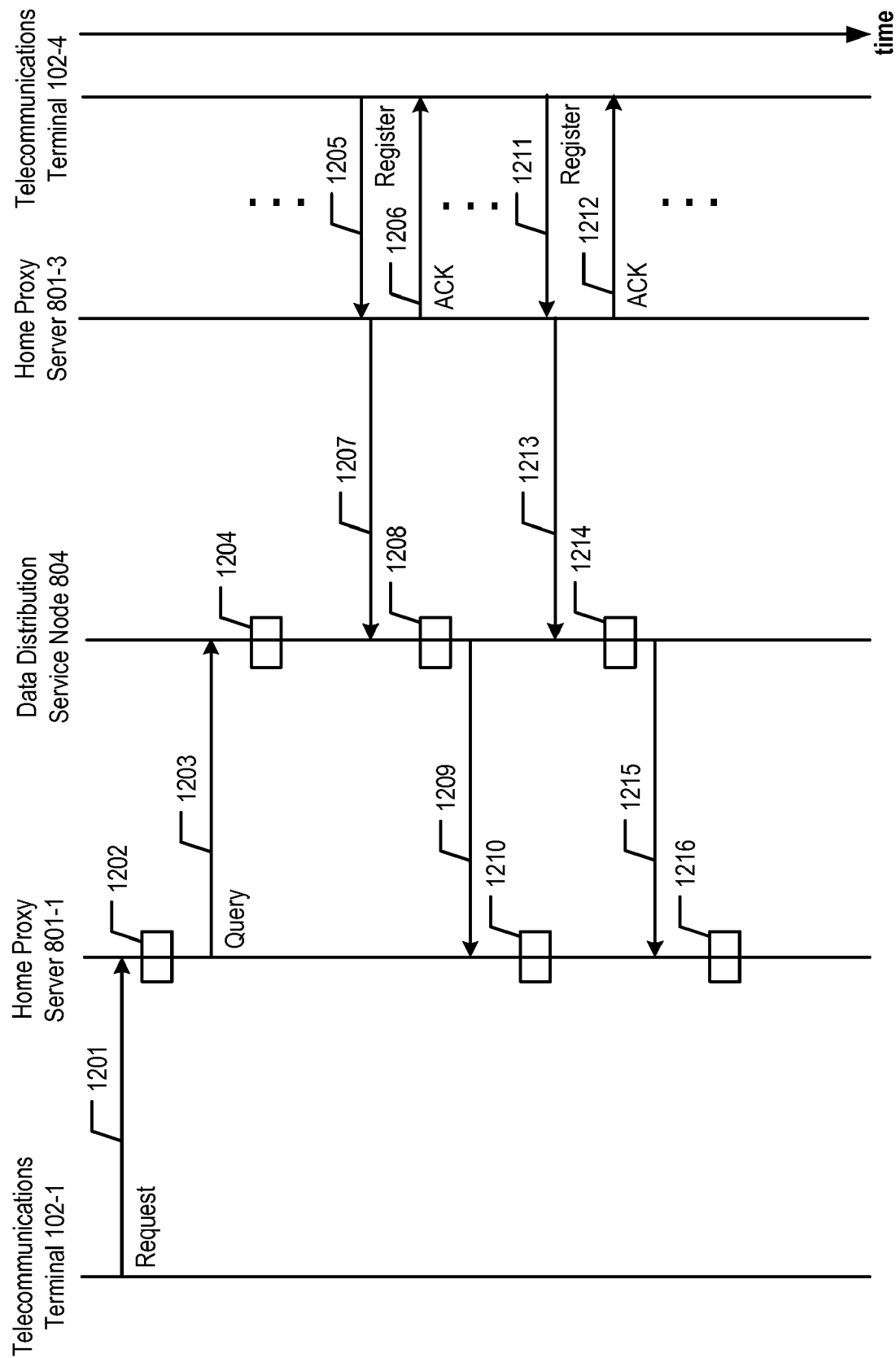
FIG. 12 depicts a second call flow, in accordance with the illustrative embodiment.

FIG. 12 depicts a second call flow that involves telecommunications terminals 102-1 and 102-4, in accordance with the illustrative embodiment. The second call flow features the usage of a data distribution service, which operates in a data distribution layer in contrast to utilizing, for example, a SIP mechanism. As those who are skilled in the art will appreciate, some of the tasks that appear in the figures can be performed in parallel or in a different order than that depicted. Moreover, those who are skilled in the art will further appreciate that in some alternative embodiments, only a subset of the depicted tasks are performed. Additionally, as those who are skilled in the art will appreciate, some or all of the tasks depicted in FIG. 12 may be performed concurrently with some or all of the tasks depicted in FIG. 11, either at the same node or at least within the same network.

The salient tasks depicted in FIG. 12 are described, for the most part, from the perspective of a node that coordinates data distribution among proxy nodes. Specifically, data distribution service node 804 coordinates the data distribution in the example depicted. As those who are skilled in the art will appreciate, however, in some alternative embodiments some or all of those tasks can be performed at a different data-processing system.

In the illustrative call flow, a proxy server, in this case server 801-1, receives from terminal 102-1 a Session Initiation Protocol (SIP) request for a party to be contacted, in this case user 101-4 who is associated with terminal 102-4. The routing information of the party to be contacted is not known to server 801-1; that is, no mapping of any indicium of user 101-4 to the address of the user is already present at the server. In accordance with the illustrative embodiment, server 801-1 as a result transmits a query to the data distribution service, which is coordinated at node 804, in order to indicate an interest in obtaining the user information that is currently absent from server 801-1, such as the user's address within system 800. For reasons of clarity, the intermediate proxy servers (i.e., servers 802-1 and 802-2) are not shown in FIG. 12.

At task 1201, home proxy server 801-1 receives a SIP request message from terminal 102-1, in well-known fashion. For example, this request might correspond to a SIP INVITE for initiating a call session between terminals 102-1 and 102-4. In transmitting the message, terminal 102-1 requests the address of user 101-4. A mapping of an indicium of a user to the address of a telecommunications terminal, such as the address of user 101-4's terminal, is described above and with respect to Table 1.

At task 1202, server 801-1 determines whether the desired information about user 101-4 is already present at the server. Additionally, in some embodiments, server 801-1 forwards the received request in well-known fashion.

At task 1203, data distribution node 804 receives a query from server 801-1, which query indicates an interest in user 101-4's information, in accordance with the illustrative embodiment. The query is based on a mapping of any indicium of the user to the address of user 101-4 being absent from the server, as determined at task 1202.

In some embodiments, the transmitting of the query can be based on how often the called party is contacted, or on some other call statistic related to the called party, which statistic can be determined from a call log, for example.

At task 1204, node 804 determines whether the query should be processed. In some embodiments, the processing of the request can be based on how often the called party is contacted, or on some other call statistic related to the called party. Node 804, in some embodiments, then transmits an acknowledgment back to server 801-1.

Meanwhile, and asynchronously with respect to the tasks described thus far, terminal 102-4 registers with its home proxy, server 801-3. For example, terminal 102-4 might register once, sporadically, or periodically, in well-known fashion. As depicted, proxy server 801-3 receives a registration from terminal 102-4 at task 1205, followed by acknowledging the registration at task 1206.

At task 1207, and as part of an ongoing data distribution service, node 804 receives from server 801-3 a set of data that comprises user 101-4's address. In this case, the received address corresponds to terminal 102-4 having registered at task 1205. In some embodiments, server 801-3 transmits the data set to node 804 only after receiving one or more queries from node 804 that convey an interest in receiving the data.

At task 1208, node 804 determines whether to forward to server 801-1 the set of data that comprises the user address. In some embodiments, node 804 populates its own database with the received set of data.

Node 804 forwards the data set at task 1209. As part of the data distribution service, node 804 transmits a received set of data to a first set of one or more nodes that have conveyed an interest in receiving the data; node 804 does this for at least some of the occurrences of node 804 having received data from a second set of one or more nodes. In some embodiments, the transmitting of the set of data is also based on how often user 101-4 has been contacted.

At task 1210, server 801-1 populates its database with a mapping of i) a predetermined indicium of user 101-4 to ii) user 101-4's address that was received at task 1209. In some embodiments, server 801-1 also acknowledges having received the address. At this point, when server 801-1 receives a SIP request from any terminal attempting to contact terminal 102-4, server 801-1 is able to forward the SIP request to server 801-3, while bypassing the proxies between servers 801-1 and 801-3; this is possible because of the mapping now being present at server 801-1.

Meanwhile, and asynchronously with respect to at least some of the tasks described thus far, terminal 102-4 registers with its home proxy, server 801-3. For example, terminal 102-4 might register once, sporadically, or periodically, in well-known fashion. As depicted, proxy server 801-3 receives a registration-related message from terminal 102-4 at task 1211, followed by acknowledging the registration at task 1212. In this case, the registration-related message is actually a de-registration, such as when terminal 102-4 is moving away from server 801-3 to a new home proxy (e.g., proxy 801-4, etc.).

At task 1213, and as part of an ongoing data distribution service, node 804 receives from server 801-3 a set of data that reflects the fact that terminal 102-4 has de-registered at task 1211.

At task 1214, node 804 determines whether to forward to server 801-1 the updated set of data received at task 1213. In some embodiments, node 804 populates its own database with the updated received set of data, which results in the deletion of the user address received at task 1207. In some embodiments, a decision to delete the address can be based on the elapsing of a time interval since the address became present at the node, in this case at task 1208. Node 804 forwards the data set at task 1215.

At task 1216, server 801-1 deletes, from its database, the mapping of the indicium of user 101-4 to the address that was received at 1209. The decision to delete the address from the database, instead of adding an address, is based on the updated set of data being received from node 804, in which the updated data set reflects a change of information that is related to user 101-4 at terminal 102-4, and the change of information implies that it is no longer appropriate to use that address. This is one way in which server 801-1 keeps information in the database from becoming stale.

In some embodiments, a decision to delete the address can be based on the elapsing of a time interval since the mapping of the indicium to the address became present at the node, in this case at task 1210. This is another way in which server 801-1 keeps information in the database from becoming stale.

As those who are skilled in the art will appreciate, the call flow depicted in FIG. 12 can continue beyond merely those tasks depicted. What will also be appreciated is that any number of home proxy servers can concurrently perform the tasks of the illustrative embodiment for one or more requesting terminals being served, in which those terminals request user information related to one or more parties being contacted.

It is to be understood that the disclosure teaches just one example of the illustrative embodiment and that many variations can easily be devised by those skilled in the art after reading this disclosure and that scope is to be determined by the following claims.

What is claimed is:

1. A method comprising:
receiving, at a first node, a first request from a first telecommunications terminal for an address of a first party in a telecommunications network;
transmitting, from the first node to a second node, a request for subscribing to a Session Initiation Protocol registration event package for the first party, wherein the transmitting of the request for subscribing is based on no mapping of any indicium of the first party to the address of the first party being present at the first node;
receiving a notification from a third node, wherein the notification comprises an indication that the first party is registered and the address of the first party;
populating a database at the first node with a mapping of a predetermined indicium of the first party to the address of the first party received as part of the notification;
receiving, at the first node, a second request from a second telecommunications terminal, wherein the second request comprises the indicium of the first party; and
forwarding the second request to the address of the first party, based on the mapping that is populated in the database, wherein the second node is bypassed.

2. The method of claim 1 further comprising:
receiving a notification from the third node, wherein the notification comprises an indication that the first party is unregistered and the address of the first party; and
deleting the mapping from the database at the first node, in response to the receiving of the notification.

3. The method of claim 1 further comprising deleting the mapping from the database at the first node, based on a time interval elapsing since the mapping became present at the first node.

4. The method of claim 1 wherein the registration event package is defined in accordance with RFC 3680.

5. The method of claim 1 wherein the first node is the home proxy of the first telecommunications terminal.

6. The method of claim 1 wherein the first node is a proxy other than the home proxy of the first telecommunications terminal.

7. The method of claim 6 wherein the first node is an edge proxy.

8. The method of claim 1 wherein the transmitting is also based on how often the first party is contacted.

9. A method comprising:
receiving, at a second node, a query from a first node for an address of a first party in a telecommunications network, wherein the query is based on no mapping of any indicium of the first party to the address of the first party being present at the first node;
transmitting the address to the first node whenever a data set that comprises the address of the first party is received at the second node from a third node, for at least one occurrence of the receiving of the address at the second node; and
subsequent to the transmitting of the address to the first node, transmitting at least one update to the first node, based on a change in information that is related to the first party,
wherein transmitting, to the first node, at least one of the address, and
the update causes the first node to populate a database with a mapping of the indicium of the first party to the address of the first party, and
wherein at least one of the transmitting of the address to the first node, and
the transmitting at least one update to the first node enables the first node to forward requests, received from telecommunications terminals and that include the indicium of the first party, to the address of the first party and bypass an intermediate node in the telecommunications network.

10. The method of claim 9 wherein a hierarchical relationship exists between a first database at the first node and a second database at the second node, the first database being subordinate to the second database such that the first second database concentrates a set of data from one or more sources that are external to the second database, and the first database receives at least a portion of the set from the second database.

11. The method of claim 10 wherein the change of information corresponds to a deletion of the address of the first party from the second database.

12. The method of claim 10 wherein the transmitting of the at least one update results in the deletion of the address of the first party from the first database.

13. The method of claim 9 wherein the change of information corresponds to the first party moving to a new address.

14. The method of claim 9 wherein the transmitting of the at least one update is also based on a time interval elapsing since the mapping became present at the second node.

15. The method of claim 9 wherein the transmitting of the address is also based on how often the first party is contacted.

16. The method of claim 9 wherein the address of the first party is unique within a telecommunications network in which the address is to be utilized, wherein the telecommunications network comprises the first node, the second node, and the third node.

17. An apparatus comprising:
a receiver configured to receive a first request from a first telecommunications terminal for an address of a first party in a telecommunications network;
a memory;
a processor configured to determine that no mapping of any indicium of the first party to the address of the first party is present in the memory; and
a transmitter configured to transmit to a first node a request for subscribing to a Session Initiation Protocol registration event package for the first party, wherein the transmitting of the request for subscribing is based on the processor determining that no mapping is present,
wherein the receiver is further configured to receive from a second node a notification that comprises an indication that the first party is registered and the address of the first party,
wherein the processor is further configured to populate a database with a mapping of an indicium of the first party to the address of the first party received as part of the notification,
wherein the memory is further configured to store the database,
wherein the receiver is further configured to receive a second request from a second telecommunications terminal, wherein the second request comprises the indicium of the first party, and wherein the transmitter is further configured to bypass the first node and forward the second request to the address of the first party, based on the mapping that is populated in the database.

18. An apparatus comprising:
a proxy node configured to transmit a query for an address of a first party, based on no mapping of any indicium of the first party to the address of the first party being present at the proxy node; and
a data distribution node configured to:
receive the query;
transmit the address to the proxy node whenever a data set that comprises the address of the first party is received at the data distribution node from another node, for at least one occurrence of the receiving of the address at the data distribution node; and
subsequent to the transmitting of the address to the proxy node, transmit at least one update to the proxy node, based on a change in information that is related to the first party,
wherein the proxy node is further configured to receive the address from the proxy node and populate a database to map the indicium of the first party to the address of the first party,
wherein the proxy node is further configured to, subsequent to receiving the address of the first party and based on the mapping of the indicium of the first party to the address of the first party, bypass an intermediate node and forward, to the address of the first party, a request received by the proxy node from a terminal that includes the indicium of the first party.

19. The apparatus of claim 18 wherein a hierarchical relationship exists between a first database at the data distribution node and a second database at the proxy node, the second database being subordinate to the first database such that the first database concentrates a set of data from one or more sources that are external to the first database, and the second database receives at least a portion of the set from the first database.

20. An apparatus comprising:
a receiver means for receiving, at a first node, a first request from a first telecommunications terminal for an address of a first party in a telecommunications network;
a transmitter means for transmitting, from the first node to a second node, a request for subscribing to a Session Initiation Protocol registration event package for the first party, wherein the transmitting of the request for subscribing is based on no mapping of any indicium of the first party to the address of the first party being present at the first node; and
a database means configured to map an indicium of the first party to an address of the first party,
wherein the receiver means receives, at the first node, a notification from a third node, wherein the notification comprises an indication that the first party is registered and the address of the first party,
wherein the database means is populated with a mapping of the indicium of the first party to the address of the first party,
wherein the receiver means receives, at the first node and from a second telecommunications terminal, a second request that includes the indicium of the first party, and
wherein the transmitter means forwards the second request to the address of the first party, based on a mapping of the indicium of the first party to the address of the first party, and bypasses an intermediate node in the telecommunications network.

21. An apparatus comprising:
a receiver means for receiving, at a data distribution node, a query from a proxy node for an address of a first party in a telecommunications network, wherein the query is based on no mapping of any indicium of the first party to the address of the first party being present at the proxy node; and
a transmitter means for transmitting the address to the proxy node whenever a data set that comprises the address of the first party is received at the data distribution node from another node, for at least one occurrence of the receiving of the address at the data distribution node;
wherein the transmitter means transmits, subsequent to the transmitting of the address to the proxy node, at least one update to the proxy node based on a change in information that is related to the first party,
wherein at least one of
transmitting the address to the proxy node, and
transmitting at least one update to the proxy node
causes the proxy node to populate a database with a mapping of the indicium of the first party to the address of the first party, and
wherein at least one of
transmitting the address to the proxy node, and
transmitting at least one update to the proxy node
enables the proxy node to forward requests, received from telecommunication terminals and that include the indicium of the first party, to the address of the first party and bypass at least one intermediate node in the telecommunications network.

* * * * *